(12) United States Patent
Deshpande et al.

(10) Patent No.: US 7,970,819 B2
(45) Date of Patent: *Jun. 28, 2011

(54) METHODS AND SYSTEMS FOR TRANSMITTING DIGITAL IMAGES

(75) Inventors: Sachin G. Deshpande, Vancouver, WA (US); Wenjun Zeng, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1086 days.

This patent is subject to a terminal disclaimer.

(21) Appl. No.: 11/683,324

(22) Filed: Mar. 7, 2007

(65) Prior Publication Data

US 2007/0165935 A1    Jul. 19, 2007

Related U.S. Application Data

(62) Division of application No. 09/709,985, filed on Nov. 10, 2000, now Pat. No. 7,206,804.

(51) Int. Cl.
*G06F 15/16* (2006.01)

(52) U.S. Cl. ........ 709/203; 709/228; 709/231; 709/236; 709/247

(58) Field of Classification Search .................. 709/203, 709/228, 231, 236, 247
See application file for complete search history.

(56) References Cited

U.S. PATENT DOCUMENTS

| | | | |
|---|---|---|---|
| 6,714,205 B1 * | 3/2004 | Miyashita et al. | 345/536 |
| 6,785,423 B1 * | 8/2004 | Joshi et al. | 382/235 |
| 6,938,211 B1 * | 8/2005 | Chang et al. | 715/733 |

* cited by examiner

*Primary Examiner* — Larry Donaghue
*Assistant Examiner* — Nicholas Taylor
(74) *Attorney, Agent, or Firm* — Krieger Intellectual Property, Inc.; Scott C. Krieger

(57) ABSTRACT

Embodiments of the present invention comprise methods and systems for communicating a recipient-selected customization of a digital image using an index file. The index file associates a customization characteristic with the segments of the digital image required to construct a customized image that exhibits the customization characteristic.

20 Claims, 10 Drawing Sheets

Bitstream Structure

Layer-resolution-component-position progressive order of packets.

Layer-resolution-component-position progressive order of packets.

Mapping from code-block left boundaries to vertical lines in the spatial image domain.

Partition of the spatial image for code-blocks in a particular subband

METHODS AND SYSTEMS FOR TRANSMITTING DIGITAL IMAGES

RELATED REFERENCES

This application is a divisional application of U.S. Pat. No. 7,206,804, entitled "Methods and Systems for Transmitting Digital Images," filed on Nov. 10, 2000. U.S. Pat. No. 7,206,804 is hereby incorporated by reference herein.

FIELD OF THE INVENTION

Embodiments of the present invention relate to methods and systems for managing and transmitting image data.

BACKGROUND

In many Internet and network applications, large image files are frequently transferred. These large image files must be transmitted from server to client with accuracy and speed. When connection speeds are not optimal, these images can take an inconveniently long time to download to a client. Using known methods, this extended lag results in high latency or delay before display of the complete image.

Image files can also be problematic when their size, resolution or other attributes are not optimized to the needs of the user.

SUMMARY

Embodiments of the present invention comprise methods and systems that allow customized transmission of image files over a network. Embodiments of the present invention provide for scalable image resolution, quality scalability including signal-to-noise ratio (SNR) scalability, region-of-interest (ROI) selection and other features.

Embodiments of the present invention may also comprise image index files which may be accessed from a client application that allows for image customization prior to complete image transmission. Using the client application and an index file associated with the target image, a user may select an optimal resolution at which the image may be transmitted. When images are large and/or high resolution, latency occurs as the file is transmitted to the client. Users who do not need to see the image at its highest resolution may select a lower resolution at which to view the image thereby decreasing latency and speeding the process.

In some embodiments of the present invention, a user may select quality scalability thereby allowing a client application to begin rendering an image before the image is fully transmitted. This may be performed by rendering an image coarsely and reducing the coarseness of the image progressively as data is received.

Some embodiments of the present invention may allow for region-of-interest (ROI) scalability wherein a user may select a region-of-interest that may be transmitted alone or given priority in the image transmission process. A user may select a ROI to be viewed and an embodiment of the present invention may transmit only that area to the user thereby decreasing latency. Alternatively, a user may select a ROI and another embodiment of the present invention will select that ROI area for priority transmission to be followed by transmission of the remainder of the image. In this manner, a ROI may be viewed more quickly and, if desired, another portion or the remainder of the image may be viewed after inspection of the ROI.

In some embodiments, the above described features and/or other features may be implemented using a client application which downloads the target image at a reduced resolution and displays that image as a "thumbnail" for user manipulation, reference and input such as ROI selection and other selection. Once the thumbnail has been downloaded and displayed, a user may select a portion of the image for display at a resolution higher than that of the thumbnail. A user may select a ROI on the thumbnail or on a higher-resolution image using known input device methods or by other methods. Generally, a rectangular region will be delineated by a series of inputs, such as mouse clicks, and the client application will request the portion of the image corresponding to the designated region of interest. In this manner, a portion of the image may be displayed without waiting for display of the entire image.

Some embodiments of a client application may provide for selection of image resolution. Typically, for large, high-resolution images, there will be a range of resolutions between the maximum image resolution and a minimum thumbnail resolution. These embodiments will allow a user to select an optimum resolution below the maximum image resolution which will reduce latency.

A client application of embodiments of the present invention may also allow a user to select whether quality scalability is enabled. When enabled, quality scalability can render relevant image details prior to complete image transmission thereby allowing a user to make image decisions prior to complete transmission of the image. Quality scalability may be applied to the thumbnail used for ROI selection as well as the target image.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 8:
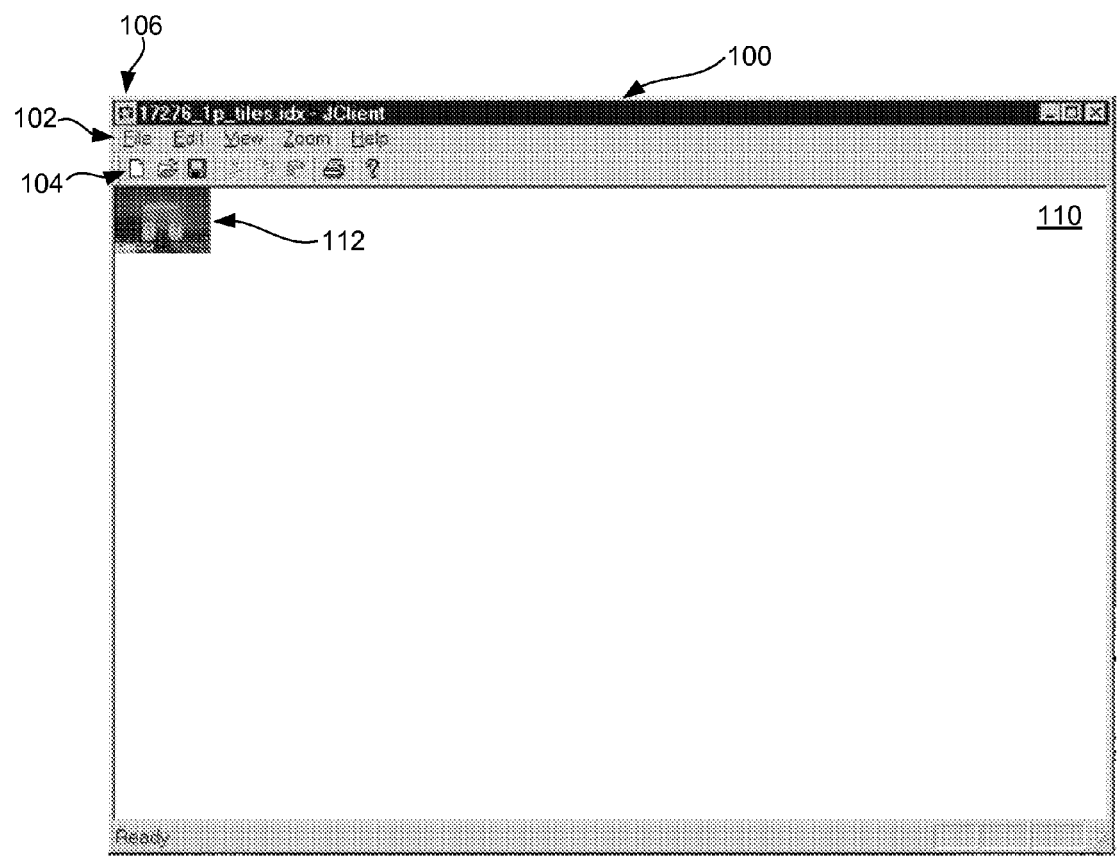
Figure 9:
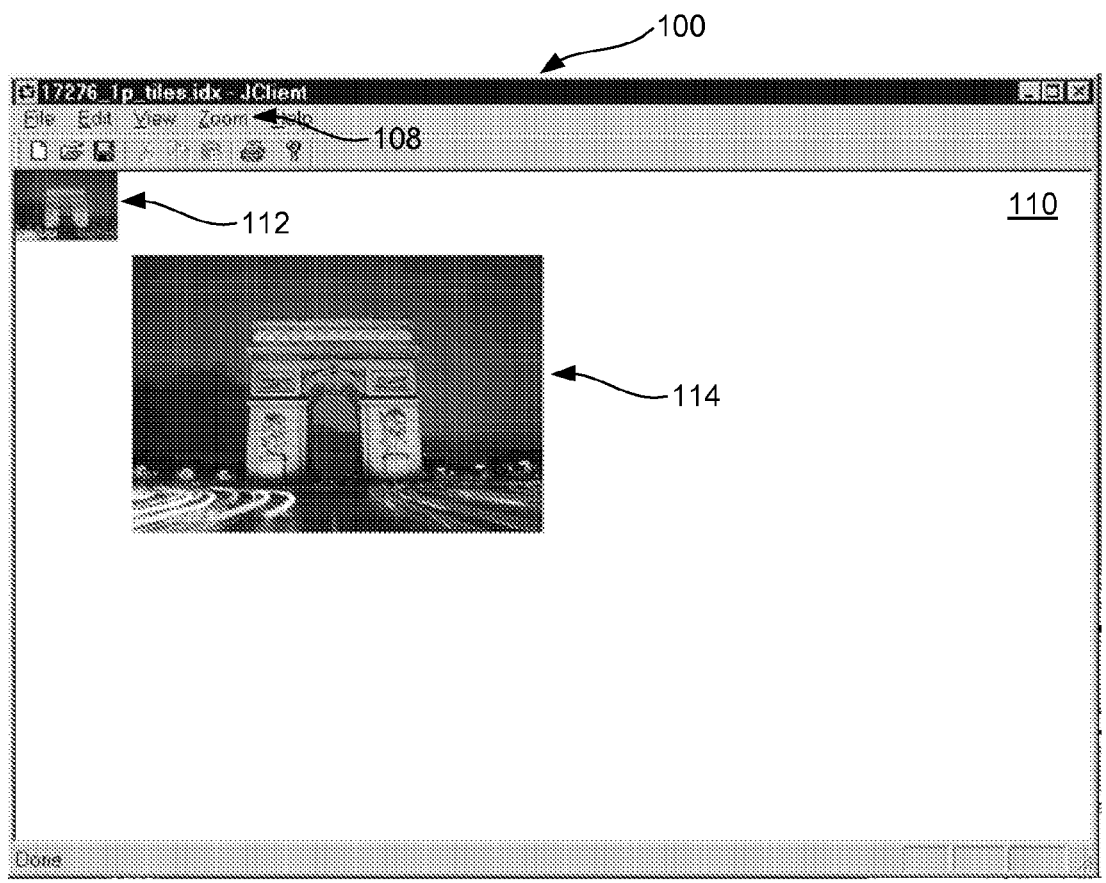
Figure 10:
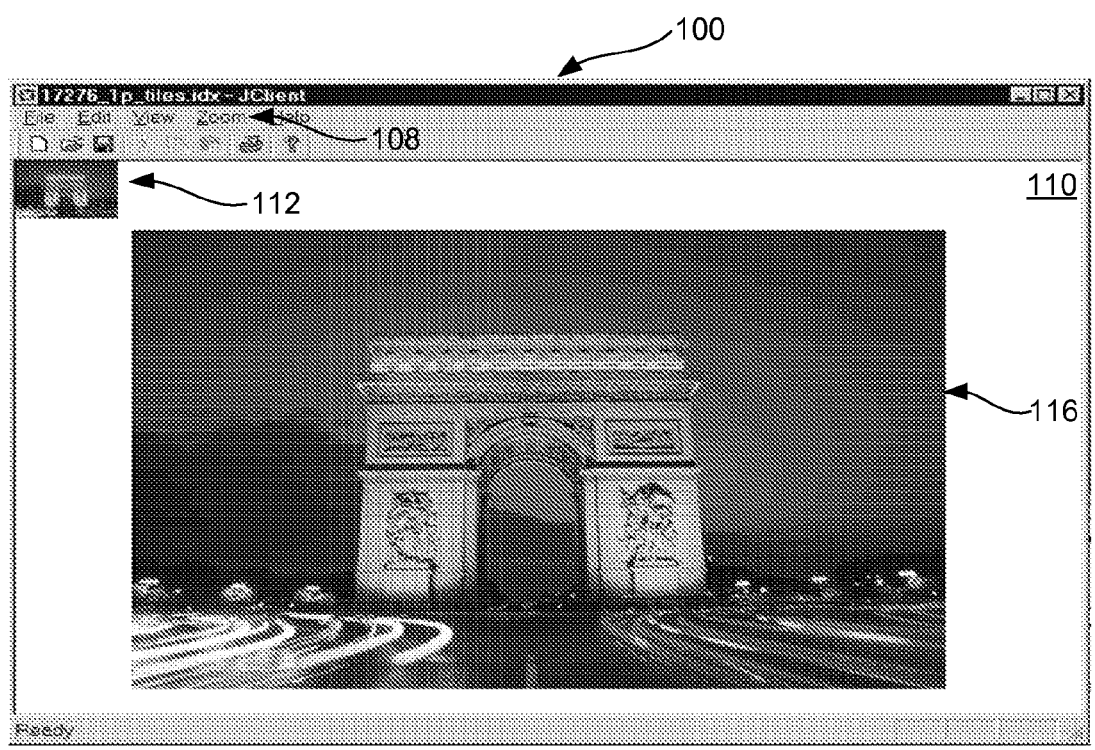
Figure 11:
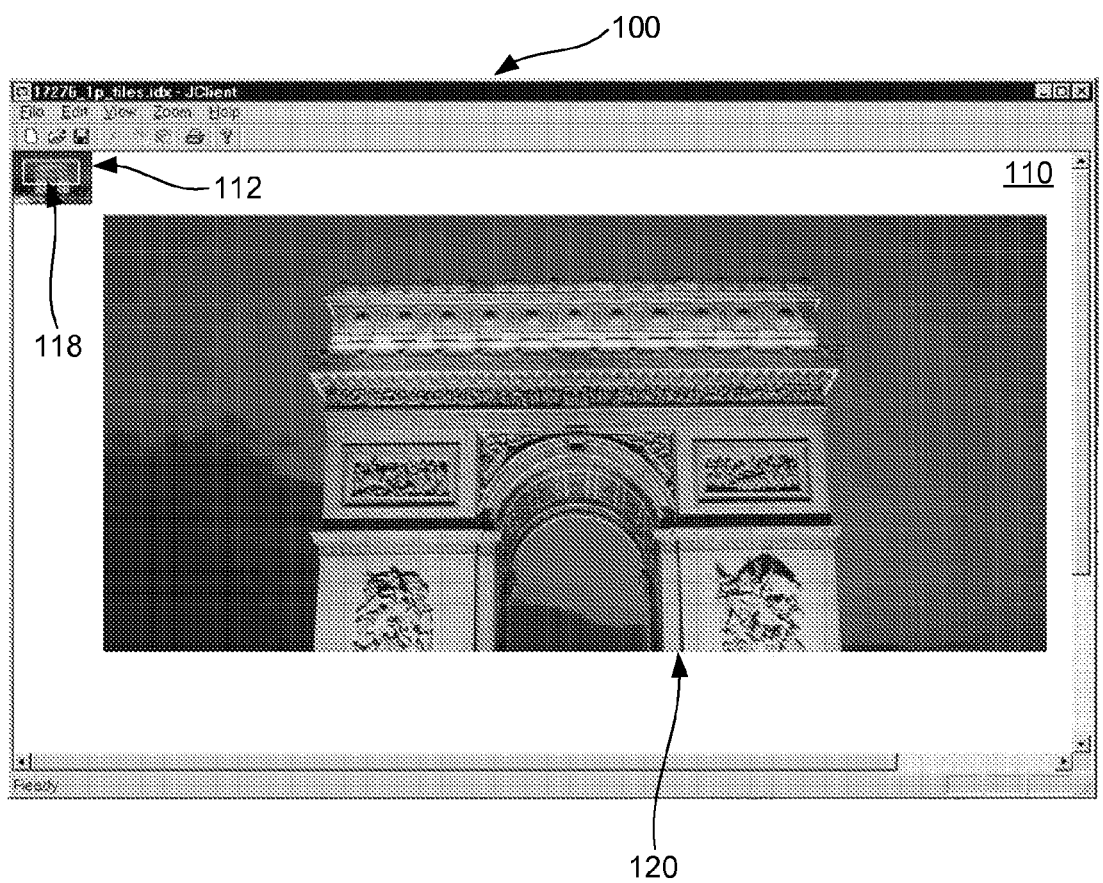

FIG. 8 displays an exemplary embodiment of a client image application;

FIG. 9 displays the application shown in FIG. 8 with an image shown in the window;

FIG. 10 displays the application of FIGS. 8 and 9 with a higher-resolution image shown in the window; and FIG. 11 displays the application of FIGS. 8-10 with an image shown in the window that has been edited using region-of-interest selection.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention are explained in reference to a specific embodiment which employs an HTTP protocol for streaming images in the JPEG2000 format. While this is used as a primary example, other protocols and image formats may be used in embodiments of the present invention.

Protocol

Figure 1:
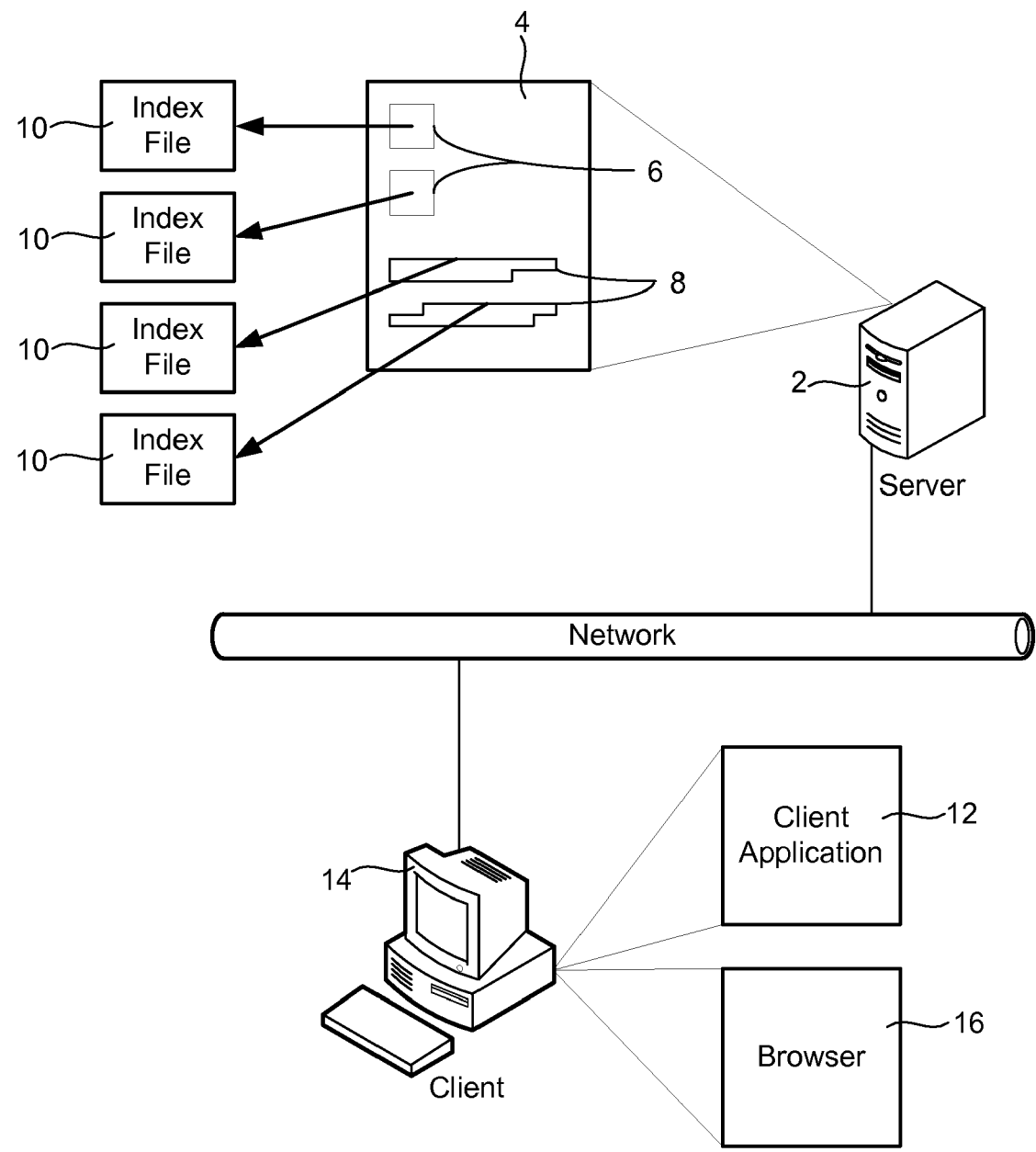
FIG. 1 is a diagram showing various hardware and software elements of an embodiment of the present invention.

Some embodiments of the present invention may be explained in reference to FIG. 1 wherein a web server 2 hosts a web page 4 comprising thumbnail images 6 in an electronic image format such as JPEG, GIF, JPEG2000 or another format. Web page 4 may also comprise names of images 8, such as a URL, hyperlink or similar mechanism. Other embodiments may comprise image file lists, directories, indexes or other methods of image organization rather than a typical web page. As used in this context, a web page 4 may comprise traditional HTML web pages, XML pages, or pages or sites created with other languages, protocols and configurations for PCs, handheld devices, web-enabled cell phones, pagers and other computing devices.

Each thumbnail image 6 or name 8 is linked to an index file 10. An index file 10 may have an extension which may be recognized as a MIME type by the client's web browser or be otherwise recognized as a unique file type by a browser application. Each index file may also be associated with a client image application 12 of embodiments of the present invention. This client image application 12 can provide for streaming and display of image files. A client image application 12 may take the form of a browser plug-in or browser helper program or may be implemented as a program working in conjunction with other applications or a stand-alone program. In some embodiments, client image application 12 comprises a JPEG2000 enabled client browser which can handle streaming and display of JPEG2000 images.

The index file 10 comprises information which helps the client image application 12 to determine which portions of the bitstream are necessary to render an image selection. The client image application 12 creates its file transfer requests, such as HTTP requests, using information in the index files 10. An index file 10 may be created prior to image access by the client device 14 using an indexing application (not shown) which may create an index file 10 through analysis of a target image file. An index file 10 may also be created "on-the-fly" by a server application (not shown). As an image 6 or name 8 is selected, a server application may analyze the selected image and create an index file 10 for that image in preparation for further image viewing.

During processes of embodiments of the present invention, an index file 10 may be downloaded from a web server 2 by a web browser 16 and passed to a client image application 12, such as a JPEG2000 client browser, when a user clicks on an image thumbnail 6 or similar link. An index file 10 may contain information about an image, such as a URL or information derived from a main header, a tile header, a packet header or other information. Further details of exemplary index file structure are given below.

In one exemplary embodiment using HTTP/1.1 protocol and images encoded in JPEG2000 format. A client computer 14 running client image application 12 may send a request to a web server 2 using the URL information from an index file 10, to stream the lowest resolution version of the JPEG2000 image. This request may use the byte-ranges feature of HTTP/1.1 protocol to obtain only a portion of the JPEG2000 bitstream.

The downloaded lowest resolution version of the JPEG2000 image may then be decoded and displayed in the JPEG2000 client browser window.

In some embodiments, a user can interactively manipulate the view of the image using zoom, pan and other controls through an user interface on the JPEG2000 client browser 16 or a client application 12. The corresponding byte-ranges may be found from the image index file 10 and appropriate HTTP requests, corresponding to the manipulated views, may be sent to the web server. In this exemplary embodiment, a single request may be created to obtain all the relevant parts of the bit-stream corresponding to a region-of-interest selected by a user. This feature may be implemented using the byte-ranges feature of the HTTP/1.1 protocol to obtain only the required portions of the JPEG2000 bitstream. This results in a lower delay. Also the resultant response is easier to parse.

The resultant response from the web server may be decoded and displayed in the JPEG2000 client browser window.

Some embodiments may also employ the built-in caching support in HTTP1.1.

Sample Session

Figure 2:
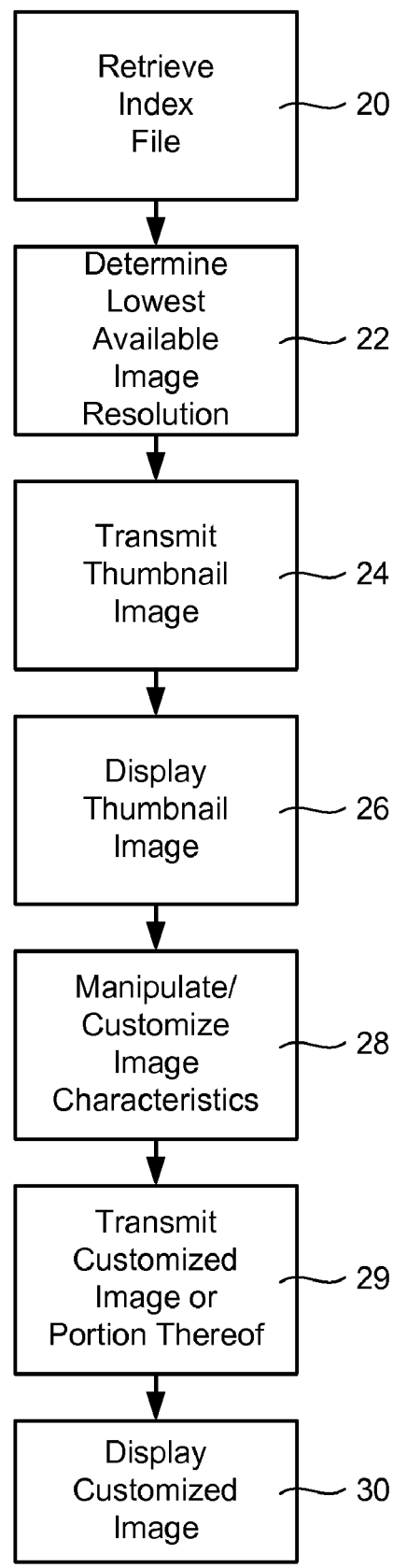
FIG. 2 is a chart showing various steps of an embodiment of the present invention.

The methods of an exemplary embodiment of the present invention may be explained in reference to FIG. 2. This particular embodiment may utilize HTTP streaming of a JPEG2000 image as described in reference to an embodiment above. The details and results shown here are those obtained by using a real web server and a HTTP/1.1 command line client. A HTTP/1.1 compliant Apache server (version 1.3) running on Microsoft Windows NT 4.0 was used.

Typically, the first step in this process comprises a transmission of pertinent image data to the client from the web server 20. This may comprise selection of a thumbnail 6, name 8 or other link that is related to an image. As explained above, an index file 10 is compiled and associated with each image. Upon selection of the thumbnail 6, name 8 or other link, the index file 10 of the related image may be sent to the client browser. The following request/response sequence illustrates an example of how this step may be accomplished.

1. Get the index file:
Client (Web Browser) to Server Request:
GET /index_files/index1.idx HTTP/1.1

Host: www.host1.com
CRLF
Server to Client (Web Browser) Response:
HTTP/1.1 200 OK
Date: Fri, 7 Jul 2000 22:45:48 GMT
Server: Apache/1.3.12 (Win32)
Last-Modified: Fri, 7 Jul 2000 22:45:28 GMT
ETag: "0-56-39665d88"
Accept-Ranges: bytes
Content-Length: 86
Content-Type: text/jpeg2000_index_file
CRLF
http://www.imageshost.com/image_files/
　　image1_jpeg2000.jp2
[main_header_data]..
[tile-part_header_data]..
[packet_header_data]..

Once the index file 10 has been retrieved by the client, the file is read to determine the lowest resolution available for the target image 22. A minimum resolution above the lowest resolution may be used to ensure that the thumbnail has sufficient detail. Optimum data transfer times are achieved by finding the lowest usable resolution. However, other resolutions below the maximum resolution may be selected as a user preference when the lowest resolution is not desirable. The index file may comprise an image URL and available resolution data such as the example data below.

2. The index file has information about the corresponding JPEG2000 image.
　e.g. The image URL is:
　http://www.imageshost.com/image_files/
　　image1_jpeg2000.jp2
　The lowest resolution version is encoded in bytes [120, 1068].

Once the thumbnail resolution is determined and the location of the data corresponding to that resolution is ascertained, the client image application 12 may request transfer of the thumbnail image data. An exemplary exchange follows.

3. Get the lowest resolution JPEG2000 image
Client (Helper application) to Server Request:
GET /image_files/image1_jpeg2000.jp2 HTTP/1.1
Host: www.imageshost.com
Range: bytes=120-1068
CRLF
Server to Client (Helper application) Response
HTTP/1.1 206 Partial Content
Date: Fri, 7 Jul 2000 22:38:58 GMT
Server: Apache/1.3.12 (Win32)
Last-Modified: Wed, 5 Jul 2000 19:04:01 GMT
ETag: "0-fffb-396386a1"
Accept-Ranges: bytes
Content-Length: 949
Content-Range: bytes 120-1068/65531
Content-Type: image/jpeg2000
CRLF
[image data bytes 120-1068]

When the thumbnail image data has been transmitted to the client 24, the data is decoded and displayed on the client display 26 using the client image application 12 alone or in conjunction with a typical browser application 26. In some embodiments, the thumbnail image will be displayed in a window to allow for user manipulation and input 28. Known pointing device inputs may be used to zoom in and out, pan across the image, select regions-of-interest and support other functions. Typical menus, buttons and similar methods may be used to interface with the applications. These inputs generally result in requests from the client application 12 and/or browser 16 to send portions of the image bitstream from the server 2 to the client 14. In this manner, a user may select particular portions and resolutions of an image for transmission 29 thereby avoiding a time-consuming complete transfer of an entire image at its highest resolution.

For example, a user may interact with the displayed low-resolution thumbnail image in a JPEG2000 client browser window. This interaction results in a request to zoom in and pan to the rectangular region with top left corner at (100, 180) and width and height of 200 and 500 respectively. Then, using the index file, if the corresponding bytes needed from the JPEG2000 bitstream are 120-168, 175-200, 205-300, 345-346, 400-500, 555-666, 667-800, 900-1000, 2500-2567, 2890-3056, 5678-9000, 10000-12004, 12050-12060, 15600-15605, 17000-17001, 17005-17010, 17050-17060, 17800-17905, 20000-20005; a JPEG2000 bitstream is byte-aligned for the individual independent units. If this were not the case, the request will still be at the byte granularity and the response will be parsed to get rid of irrelevant bits. An early draft of the byteranges specification used a media type of multipart/x-byteranges. A number of older browsers and servers were coded to use this, which is not strictly compatible with the HTTP/1.1, however, some embodiments may employ this method. An example request/response sequence between client and server for this step follows.

Client to Server Request:
GET /image_files/image1_jpeg2000.jp2 HTTP/1.1
Host: www.imageshost.com
Range: bytes=120-168,175-200,205-300,345-346,400-
　500,555-666,667-800,900-1000,2500-2567,2890-
　3056,5678-9000,10000-12004,12050-12060,15600-
　15605,17000-17001,17005-17010,17050-17060,
　17800-17905,20000-20005
CRLF
Server to Client Response:
HTTP/1.1 206 Partial Content
Date: Tue, 1 Aug 2000 16:38:35 GMT
Server: Apache/1.3.12 (Win32)
Last-Modified: Wed, 5 Jul 2000 19:04:01 GMT
ETag: "0-fffb-396386a1"
Accept-Ranges: bytes
Content-Length: 8350
Content-Type:　　　　　　　multipart/byteranges1;
　boundary=3986fd0b22d
CRLF
CRLF
—3986fd0b22d
Content-type: image/jpeg2000
Content-range: bytes 120-168/65531
CRLF
[image data bytes 120-168]
—3986fd0b22d
Content-type: image/jpeg2000
Content-range: bytes 175-200/65531
CRLF
[image data bytes 175-200]
—3986fd0b22d
. . .
—3986fd0b22d
Content-type: image/jpeg2000
Content-range: bytes 20000-20005/65531
CRLF
[image data bytes 20000-20005]
—3986fd0b22d—

When the manipulated image information has been received by the client, the image data received via thumbnail image input may be decoded and displayed 30 for viewing by a user. After inspection of the user customized image, a user may further manipulate the thumbnail to further change the resolution or view of the image. This further selection will typically result in a new request to the server to transmit data required to render the newly selected image view. This process of image selection using the thumbnail image and associated applications may be repeated any number of times until a user has satisfied all interest in the image.

Image File Specifications

Details of particular embodiments of the present invention are described with reference to the JPEG2000 specification. Details of this standard may be understood by reference to the JPEG2000 Verification Model 7.0 (Technical description), ISO/IEC JTC 1/SC 29/WG 1 WG1N1684, April 2000 and the JPEG 2000 Part I Final Committee Draft Version 1.0, ISO/IEC JTC 1/SC 29/WG 1 N1646, March 2000; which are incorporated herein by reference.

In the JPEG2000 standard, an image consists of components. An image may be spatially divided into tiles and tile-components, where each tile is independently coded. A tile-component is then divided into resolutions and sub-bands. A resolution can be partitioned into precincts using rectangular grids. A sub-band is divided into code-blocks where each code-block is an independent coding unit. A precinct may consist of a rectangular region of code-blocks in each sub-band of the same resolution. The coded data of each code-block can be distributed across one or more quality layers in the codestream. The data representing a specific tile, layer, component, resolution and precinct appears in the codestream in a contiguous segment called a packet.

Figure 3:
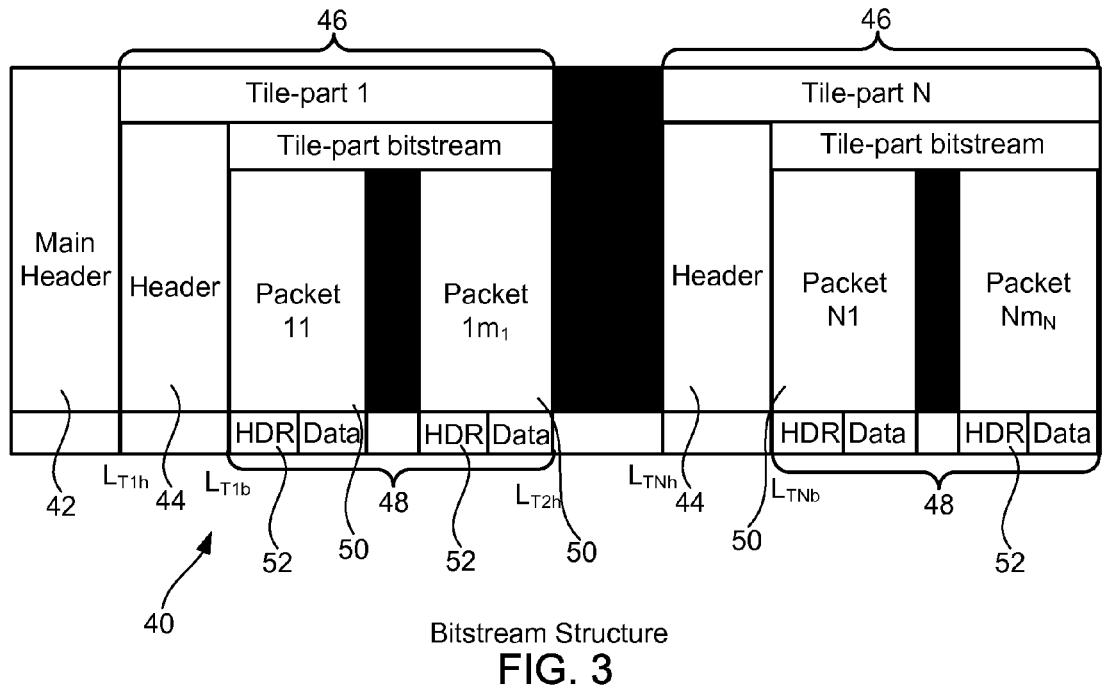
FIG. 3 is a diagram showing elements of an exemplary image file structure.

In reference to FIG. 3, types of headers in a JPEG2000 codestream 40 may be explained. The main header 42 is at the beginning of the codestream 40. The tile-part headers 44 may be found at the beginning of each tile-part 46. The main header 42 provides information about the uncompressed image such as width, height, width of a tile, height of a tile, number of components, depth of each component, etc. It also provides the coding style default (COD) (e.g., decomposition levels, progression order, number of layers, code-block size, wavelet filter used, packet partition size, etc.), the quantization default (QCD), as well as some optional information, such as region of interest information, packed packet headers (PPM), a list of packet lengths (PLM), the length of every tile-part in the codestream (TLM), etc.

The main header 42 is followed by one or more tile-parts 46 (each tile-part may comprise a tile-part header 44 and tile-part data 48). Similar information can be included in the tile-part header 44 to override the default in the main header 42. The tile-part data 48 consists of packets 50. Each packet may further comprise a packet header 52. Alternative header formats may also be used. In one alternative, main header 52 may also comprise packet header data or other information.

The lengths of the main header 42 and each tile-part header 44, and the length of each tile-part 46, can all be easily derived from the main header 42 or tile-part headers 44. In addition, the length of each packet 50 can be obtained from the main header 42 or derived from the packet headers 52, which are located either in the main header 42 or in the codestream 40.

Based on this information and the length of code-block contribution information included in each packet header 52, we can identify the locations/segments of the codestream for a particular code-block, precinct, resolution, component and layer. In fact, an index file can be generated to record this indexing information by parsing the codestream headers, including the main header 42, tile-part headers 44 and packet headers. This index file can be used to facilitate the retrieval of a particular portion of the codestream.

For a given tile, the order in which the packets 50 are interleaved is called the progression order. The interleaving of the packets 50 can progress along four axes: layer, component, resolution and precinct. There are five allowable progression orders in the standard which are signaled by the COD (coding default) and/or POD (progression order default) markers in the main header 42.

1. Layer-resolution-component-position progressive
2. Resolution-layer-component-position progressive
3. Resolution-position-component-layer progressive
4. Position-component-resolution-layer progressive
5. Component-position-resolution-layer progressive Since a JPEG2000 bitstream is well structured, it is easy to retrieve a portion of the codestream for a particular interest. Some typical applications are resolution scalable, quality scalable and region of interest streaming. We will discuss how to locate the corresponding portions of the bitstream for these applications below.

Resolution Scalable

It is relatively easy to achieve resolution scalability. If the progression order follows Order 2 or Order 3, then the data for a particular resolution will be a contiguous segment 60 in the codestream, as shown in FIG. 5, with the bounding points $L_{R0}$ 62, ..., $L_{Rnmax}$ 64, easily identifiable from the index file. If the progression order follows Order 1, then the data for a particular resolution will be distributed over several separate contiguous segments in the codestream, as shown in FIG. 4, with one segment 70 in each layer (e.g., segment ($L_{LiR0}, L_{LiR1}$) for the ith layer), for example $L_{L0}$ 72 to $L_{L0R1}$ 74.

Likewise, if the progression order follows Order 4 or 5, then the data for a particular resolution will again consists of several separate contiguous segments in the codestream, with one segment in each precinct and each component.

Quality Scalable

Figure 4:
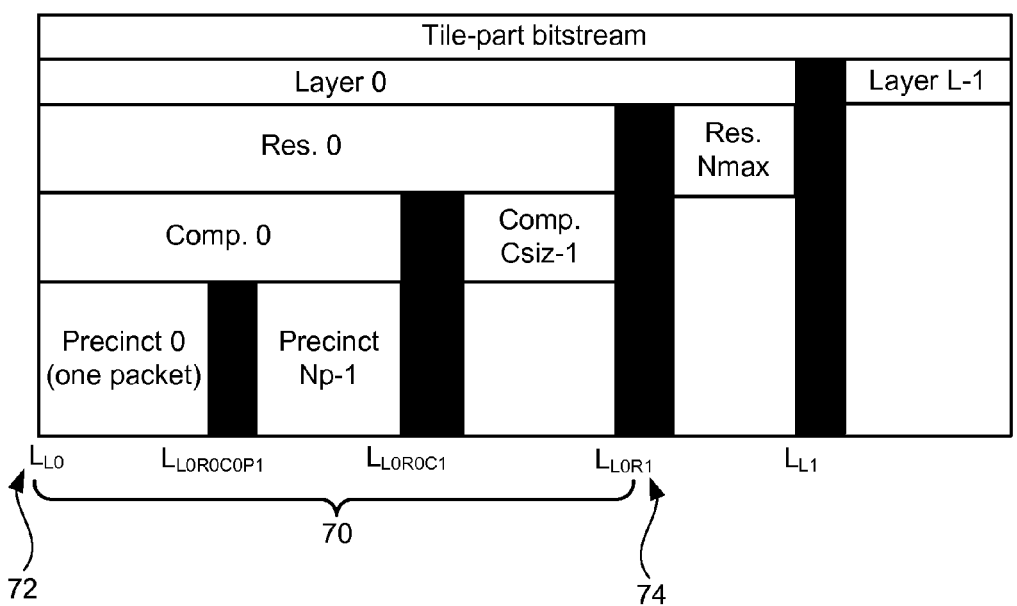
FIG. 4 is a diagram showing an exemplary tile-part bitstream which employs a layer-resolution-component progressive order.
Figure 5:
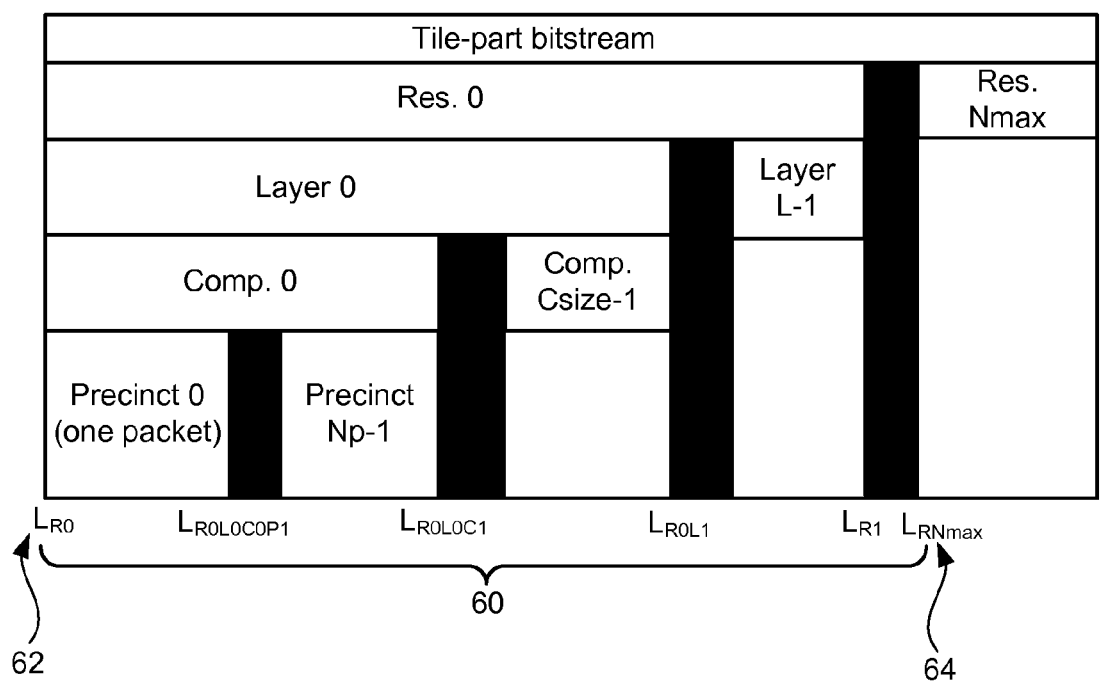
FIG. 5 is a diagram showing an exemplary tile-part bitstream which employs a resolution-layer-component progressive order.

Using embodiments of the present invention, it is also relatively easy to achieve quality scalability, especially when the codestream follows the first progression order, as shown in FIG. 4. For the other progression orders, the data for a particular layer is distributed over several separate contiguous segments in the codestream. Their locations can be obtained from the index file.

Region of Interest (ROI) Streaming

It is more involved to achieve region of interest streaming at the client side. Each image may be divided into geometric regions or tiles. An image may comprise one tile or many tiles depending on the configuration selected when the image was created. A region-of-interest may cross tile boundaries and contain partial tiles within its borders. When partial tiles are needed, each of these arbitrary regions in the spatial domain can be traced to determine how each coefficient and pixel value is reconstructed in the inverse wavelet transform. The corresponding region in each subband that contributes to the reconstruction of the ROI may then be found and the precincts and code-blocks that are needed to reconstruct the ROI can then be identified. The compressed data for these precincts and code-blocks can then be located and retrieved at the server side for streaming.

For a 1-D case, let x denote a position in the ROI mask for the parent band and let f_p and f_n denote the positive and negative extents of the relevant synthesis filter. Then the point x is influenced by any subband samples whose "upsampled" locations are in the range x-f_p to x+f_n. In most implementation notation, the low-pass subband samples have upsampled locations 2n, while the high-pass subband samples have upsampled locations 2n+1. If the f_p and f_n are computed with respect to this definition of upsampling, then for low-pass subbands, the subband samples which contribute to x are those in the range $\text{ceil}((x-f\_p)/2)$ to $\text{floor}((x+f\_n)/2)$, while for high-pass subbands, the samples which contribute to x are those in the range $\text{ceil}((x-f\_p-1)/2)$ to $\text{floor}((x+f\_n-1)/2)$.

In many applications, the region of interest will be a rectangular area. In this case, it is easier to trace the corresponding region in each subband. Only the upper-left and the lower-right corners of the ROI need to be traced. If the ROI mask in the parent subband covers the coefficients between upper-left corner (x0, y0) and lower-right corner (x1, y1), then the mask in the new/child subband will cover the coefficients between (x0', y0') and (x1', y1'), where For LL band $$X0'=\text{ceil}((x0-f\_p)/2)$$

$$Y0'=\text{ceil}((y0-f\_p)/2)$$

$$X1'=\text{floor}((x1+f\_n)/2)$$

$$y1'=\text{floor}((y1+f\_n)/2)$$

For LH band $$X0'=\text{ceil}((x0-f\_p)/2)$$

$$Y0'=\text{ceil}((y0-f\_p-1)/2)$$

$$X1'=\text{floor}((x1+f\_n)/2)$$

$$y1'=\text{floor}((y1+f\_n-1)/2)$$

For HL band $$X0'=\text{ceil}((x0-f\_p-1)/2)$$

$$Y0'=\text{ceil}((y0-f\_p)/2)$$

$$X1'=\text{floor}((x1+f\_n-1)/2)$$

$$y1'=\text{floor}((y1+f\_n)/2)$$

For HH band $$X0'=\text{ceil}((x0-f\_p-1)/2)$$

$$Y0'=\text{ceil}((y0-f\_p-1)/2)$$

$$X1'=\text{floor}((x1+f\_n-1)/2)$$

$$y1'=\text{floor}((y1+f\_n-1)/2)$$

For rectangular ROIs, the identified precincts/code-blocks will also form a rectangular region in each resolution/subband. Depending on the progression order, a row of precincts may occupy a contiguous bitstream segment. If some precincts only cover a few code-blocks of interest, then only the data for those code-blocks, instead of the whole precinct, may be retrieved and streamed.

Figure 6:
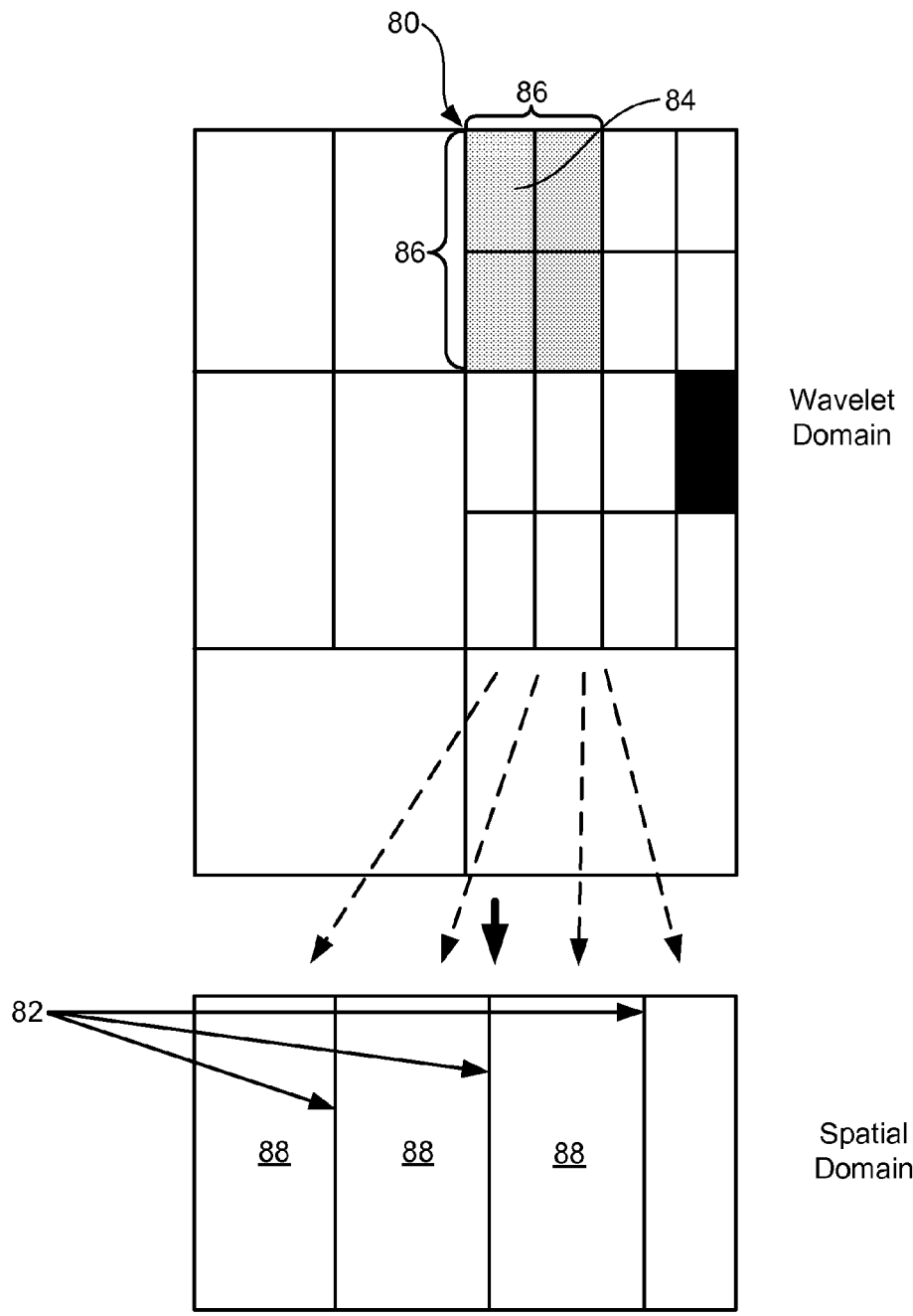
FIG. 6 is a diagram showing a method of mapping from the wavelet domain to the spatial domain.

In reference to FIG. 6, for each left boundary 80 of a code-block in a particular subband, we can identify a vertical line 82 in the spatial domain that has the property that any pixel located to the right of the line or on the line will not depend on any coefficient located to the left of the code-block boundary 80 as shown in FIG. 6. For example, if the left boundary 80 of a code-block 84 in a precinct 86 is at a position x, then the corresponding line in its parent subband will be at a position x' where If the code-block is in LL band or LH band $$X'=x*2+fp-1$$

If the code-block is in HL or HH band $$X'=x*2+fp$$

These vertical lines 82 will be equally spaced (with an interval twice as large as the code-block width) except possibly the two immediately adjacent to the boundaries of the image where there is an offset based on the filter length. These vertical lines 82 in the spatial domain then divide the image into segments 88 so that based on which segment a ROI left boundary locates, we can conclude which code-block in that particular subband will be the left-most that will be needed for the reconstruction of the ROI. Note that for different subbands, these vertical lines may be located at slightly different places.

Figure 7:
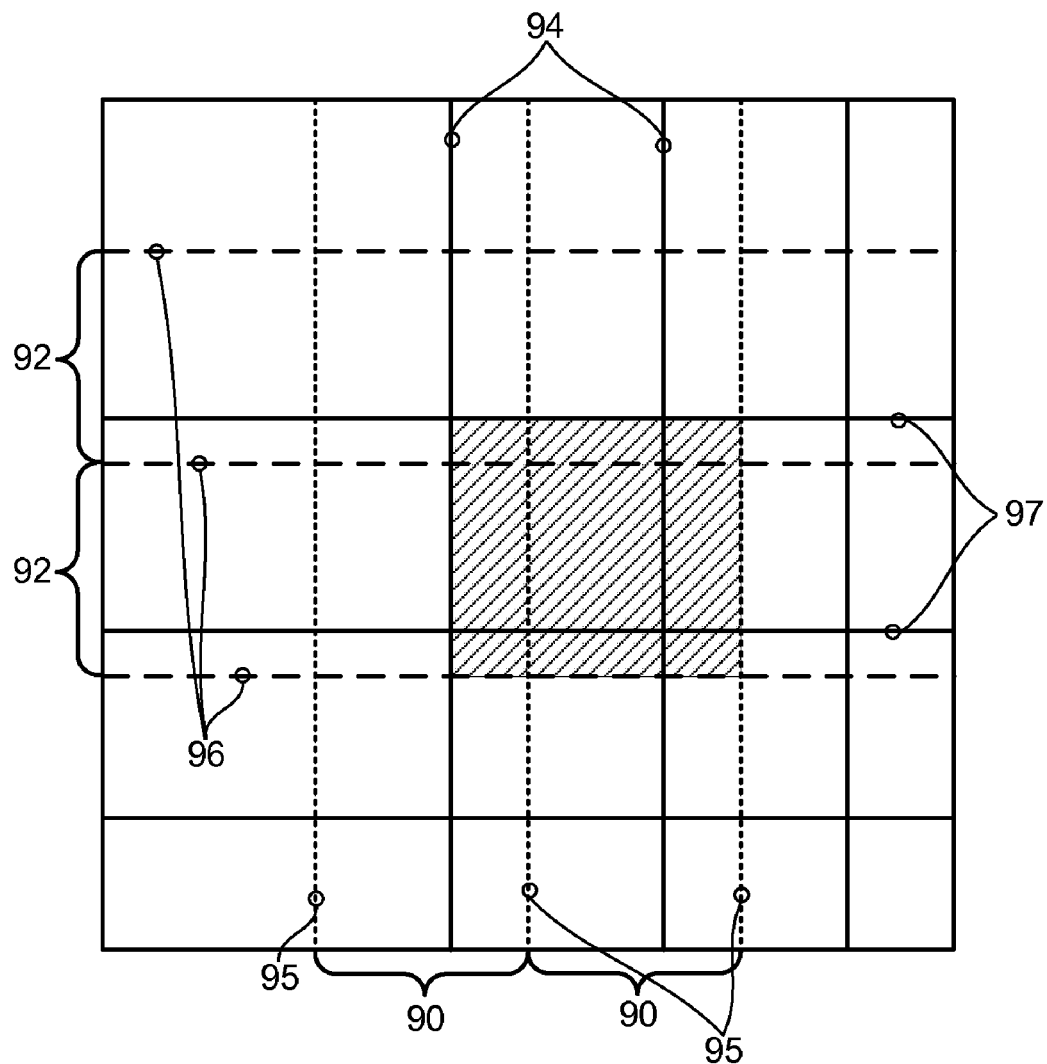
FIG. 7 is a diagram showing partition of the spatial image for code-blocks in a particular subband.

Similarly, in reference to FIG. 7, we can segment the image into vertical strips 90 or horizontal strips 92 using left boundaries 94, right boundaries 95, lower boundaries 96, and upper boundaries 97 so that the right-most, top-most and bottom-most code-blocks needed for the reconstruction of the ROI can be identified. FIG. 7 shows the partition of the spatial image for the code-blocks in a particular subband.

Typically, the selection of a ROI will not result in boundaries that coincide exactly with the vertical and horizontal lines in the spatial domain which correspond to code-block boundaries. However, ROI boundaries may be matched to these lines by adjusting the boundaries to coincide with the lines. In particular, a ROI left boundary may be matched to the closest vertical line to its left and then identified with the code block whose left boundary is mapped to this vertical line as the left-most code block. Similarly, for other boundaries, we can match ROI boundaries to code-block boundary lines in the spatial domain by selecting the closest line adjacent to the ROI boundary in a direction away from the center of the ROI.

We can also create a partition of the spatial image for the precincts of a particular resolution. For this purpose, we only need to look at the boundary code-blocks of a precinct. For the left boundary of a precinct not in the lowest resolution, we will have three vertical lines in the spatial image, one for each subband in this resolution.

The right-most of these three vertical lines will be used to partition the spatial image for the left boundaries of the precincts in that particular resolution. Similarly, we can have a partition for the right, upper and lower boundaries of the precincts in a particular resolution. For different resolutions, we generally will have different partitions.

This partition information can be stored in the index file for easier retrieval and streaming of a ROI. Given a rectangular ROI, based on the locations of the upper-left and lower-right corners in each partition, we can identify the upper-left and lower-right corners of the rectangular region of interest of precincts in each resolution, as well as the upper-left and lower-right corners of the rectangular region of interest of code-blocks in each subband. This information will then be translated into segments of interest of the codestream which will be retrieved using HTTP/1.1 or a similar protocol for the reconstruction of the ROI.

Index File Structure

The index files of embodiments of the present invention are intended for facilitating the retrieval and streaming of the portion of interest of the image. An index file may be stored at the server together with the image file, either as a separate file or, in some embodiments, as meta-data in the image file, such as in the JPEG2000 file format portion. An index file can be as simple as a re-structured collection of all the header information of the codestream. It can also be as complex as including all the spatial domain partition information discussed above for region of interest streaming. The followings are a few examples for the possible structure of index file. The trade-off is the ease of computation at the client side vs. the storage requirement at the server side and the transmission time for the index file.

Simple Index File Example

This embodiment comprises a collection of the header information of the codestream. These headers may comprise the main header, tile-part headers, all packet headers, and packet length and tile-part length information. When this information is not in the main or tile-part headers, it may need to be calculated by parsing the tile-part headers and packet headers. Note that the codestream has the option of including packed packet header and packet length information in the main header or tile-part headers. The codestream also has the option of including tile length information in the main header. If this is the case, the index file may only need to store the main header and the tile-part headers. In some embodiments, the size of the index file may be about 1% of the original codestream.

Intermediate Index File Example

This embodiment may comprise header information and progressive partition information. In addition to the header information, the index file can also store the partition information of each tile-part in terms of their progression axes. For example, if the packets are interleaved in the Resolution-layer-component-position progressive order, then all the partition points $L_{Ri}$ (for the i'th resolution), $L_{RLj}$ (for the j'th layer within the ith resolution), $L_{RLjCk}$ (for the k'th component within j'th layer and l'th resolution) and $L_{RLjCkPl}$ (for each packet) will also be stored in the index file.

Complex Index File Example

This embodiment may comprise headers, progressive partition information and spatial domain partition information. A more detailed index file may store all the spatial domain partition information discussed in the section for region of interest streaming. These may comprise the spatial domain partitions for the precincts of each resolution and the spatial domain partitions for the code-blocks of each subband. For each spatial domain partition, only the offset of the first horizontal/vertical line and the constant interval for the rest of the lines need to be stored in the index file, however other information can be stored. The mapping from each spatial segment to a precinct or a code-block may also be stored in the index file.

In general, some of the additional indexing information can either be stored at the server side in the index file, or can be derived at the client side based on a simpler index file acquired from the server by the client image application as described above with reference to the overall protocol.

While many of the described embodiments utilize a HTTP/1.1 protocol to stream JPEG2000 images from a web server, other protocols may also be used in alternative embodiments of the present invention.

Client Image Application

Some embodiments of the present invention comprise a client image application 12 which may be used to perform image customization functions. In reference to FIG. 8, some embodiments of client image application 12 may comprise a browser-like window 100. Window 100 may comprise drop-down menus 102, a toolbar 104, a status or file identification bar 106 and/or other selection devices or information methods. Generally, window 100 will comprise a graphics window 110 for display of image files.

When an image file is selected, either manually with an input device or by some other method, a thumbnail version 112 of that image is transmitted to client image application 12 and displayed to a user in graphics window 110. Thumbnail image 112 is a low-resolution version of the actual image that has been selected. The thumbnail image 112 may be downloaded much more quickly than the actual image at its highest resolution and allows a user to view the thumbnail to ensure that the image is indeed the desired image and to allow a user to make image customization requests with reference to the thumbnail 112.

Further aspects of embodiments of the present invention may be explained in reference to FIG. 9. Upon viewing thumbnail 112, a user may conclude that a resolution of 640×480 is adequate for her present needs. Consequently, she may access drop-down menu 108 to select the desired resolution from a list of available resolutions. Once a selection is made, the image 114 may be transmitted to the client application 12 and displayed in graphics window 110.

If a user desires to see the image at another resolution, the user may select the desired resolution from a menu 108 or some other method. For example, as shown in FIG. 10, a user may select a higher resolution than previously selected through drop-down menu 108, whereupon client application 12, requests the data needed to render the image at the desired resolution and displays the higher-resolution image 116 to the user in graphics window 110.

In another non-limiting example, as shown in FIG. 11, a user may select a region-of-interest which contains a portion of the image that is desired to be seen. This feature is very useful in large high-resolution medical and cartographic images where a user may wish to zoom in on a detailed local aspect of a large image. A user may select a portion of the image for viewing via menus, input device selection on the thumbnail or other methods. In the example illustrated in FIG. 11, a selection is made using common drag-and-drop selection of a rectangular area 118 that defines a region-of-interest on thumbnail 112. When the selection is made, the client application 12 requests the data associated with the newly defined region-of-interest at a selected resolution. Only the relevant portions of the image are transferred to the client and displayed as image 120 in graphics window 110. Other regions-of-interest may be selected upon subsequent user input.

Client imaging application 12 may comprise further image customization functions, for example, quality scalability may be selected and configured via menu selection or some other selection technique. Other functions may also be incorporated for image enhancement and modification.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for interactive, customized image transmission, said method comprising:
   a. creating an index file corresponding to a JPEG-2000 format image, wherein said index file associates, for at least one customization characteristic, segments of said JPEG-2000 format image required to construct an image exhibiting said at least one customization characteristic, wherein said segments are determined from a main header of said JPEG-2000 format image and at least one of a tile-part header and a packet header of said JPEG-2000 format image;

b. transmitting said index file to a client, wherein said index file enables recipient selection, at said client, of a customization of said JPEG-2000 format image;

c. determining a thumbnail resolution for said JPEG-2000 format image;

d. transmitting said JPEG-2000 format image to said client at said thumbnail resolution;

e. receiving, from a client image application, an HTTP request for selected segments of said JPEG-2000 format image, wherein said selected segments correspond, through associations in said index file, to a recipient selection of a customization of said JPEG-2000 format image; and f. transmitting said selected segments of said JPEG-2000 format image to said client, thereby allowing rendering of said recipient-selected customization of said JPEG-2000 format image on said client without transmission of the entirety of said JPEG-2000 format image.

2. The method of claim 1 wherein said at least one customization characteristic comprises one of an image resolution, an image quality parameter, and a region-of-interest.

3. The method of claim 1 wherein said client image application comprises a browser.

4. The method of claim 1 wherein said index file is comprised within said JPEG-2000 format image.

5. The method of claim 1 wherein said transmitting said index file to said client comprises an HTTP protocol.

6. The method of claim 1 wherein said transmitting said JPEG-2000 format image to said client at said thumbnail resolution comprises an HTTP protocol.

7. The method of claim 1 wherein said transmitting said selected segments of said JPEG-2000 format image to said client comprises an HTTP protocol.

8. A method for selective transmission of image files, said method comprising:

a. creating an index file corresponding to a JPEG-2000 format image, wherein said index file associates, for at least one customization characteristic, segments of said JPEG-2000 format image required to construct an image exhibiting said at least one customization characteristic, wherein said segments are determined from a main header of said JPEG-2000 format image and at least one of a tile-part header and a packet header of said JPEG-2000 format image;

b. transmitting at least a portion of said index file to a client, wherein said at least a portion of said index file enables recipient selection, at said client, of a customization of said JPEG-2000 format image;

c. determining a thumbnail resolution for said JPEG-2000 format image;

d. transmitting said JPEG-2000 format image to said client at said thumbnail resolution;

e. receiving, from a client image application, an HTTP request for selected segments of said JPEG-2000 format image, wherein said selected segments correspond, through associations in said index file, to a recipient selection of a customization of said JPEG-2000 format image; and f. transmitting said selected segments of said JPEG-2000 format image to said client, thereby allowing rendering of said recipient-selected customization of said JPEG-2000 format image on said client without transmission of the entirety of said JPEG-2000 format image.

9. The method of claim 8 wherein said at least one customization characteristic comprises one of an image resolution, an image quality parameter, and a region-of-interest.

10. The method of claim 8 wherein said client image application comprises a browser.

11. The method of claim 8 wherein said index file is comprised within said JPEG-2000 format image.

12. The method of claim 8 wherein said transmitting said at least a portion of said index file to said client comprises an HTTP protocol.

13. The method of claim 8 wherein said transmitting said JPEG-2000 format image to said client at said thumbnail resolution comprises an HTTP protocol.

14. The method of claim 8 wherein said transmitting said selected segments of said JPEG-2000 format image to said client comprises an HTTP protocol.

15. A system for interactive, customized image transmission, said system comprising:

a. an index file generator comprising a processor and a memory, said index file generator for creating an index file corresponding to a JPEG-2000 format image, wherein said index file associates, for at least one customization characteristic, segments of said JPEG-2000 format image required to construct an image exhibiting said at least one customization characteristic, wherein said segments are determined from a main header of said JPEG-2000 format image and at least one of a tile-part header and a packet header of said JPEG-2000 format image;

b. an index file transmitter for transmitting said index file to a client, wherein said index file enables recipient selection, at said client, of a customization of said JPEG-2000 format image;

c. a thumbnail-resolution determiner for determining a thumbnail resolution for said JPEG-2000 format image;

d. an image transmitter for transmitting said JPEG-2000 format image to said client at said thumbnail resolution;

e. a segment-request receiver for receiving, from a client image application, an HTTP request for selected segments of said JPEG-2000 format image, wherein said selected segments correspond, through associations in said index file, to a recipient selection of a customization of said JPEG-2000 format image; and f. a segment transmitter for transmitting said selected segments of said JPEG-2000 format image to said client, thereby allowing rendering of said recipient-selected customization of said JPEG-2000 format image on said client without transmission of the entirety of said JPEG-2000 format image.

16. The system of claim 15 further comprising a client, wherein said client comprises a client image application for selection of said recipient-selected customization.

17. The system of claim 16 wherein said client image application comprises a browser.

18. The system of claim 15 wherein said at least one customization characteristic comprises one of an image resolution, an image quality parameter, and a region-of-interest.

19. The system of claim 15 wherein said index file is comprised within said JPEG-2000 format image.

20. The system of claim 15 wherein said segment transmitter comprises an HTTP protocol.

* * * * *